(12) United States Patent
Hao et al.

(10) Patent No.: US 9,157,333 B2
(45) Date of Patent: Oct. 13, 2015

(54) INLET BLEED HEAT SYSTEM WITH INTEGRATED AIR KNIFE/SILENCER PANELS

(71) Applicant: General Electric Company, Schenectady, NY (US)

(72) Inventors: Yongjiang Hao, Shanghai (CN); Douglas Scott Byrd, Greenville, SC (US); Hua Zhang, Greenville, SC (US); Bradly Aaron Kippel, Greenville, SC (US); Jianmin Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 416 days.

(21) Appl. No.: 13/669,478

(22) Filed: Nov. 6, 2012

(65) Prior Publication Data
US 2014/0123674 A1  May 8, 2014

(51) Int. Cl.
*F02C 7/04* (2006.01)
*F02C 6/06* (2006.01)
*F01D 25/10* (2006.01)
*F01D 25/08* (2006.01)
*F02C 7/045* (2006.01)
*F02C 7/057* (2006.01)

(52) U.S. Cl.
CPC . *F01D 25/08* (2013.01); *F02C 7/04* (2013.01); *F02C 7/045* (2013.01); *F02C 7/057* (2013.01); *F01D 25/10* (2013.01); *F02C 6/06* (2013.01); *F05D 2260/96* (2013.01)

(58) Field of Classification Search
CPC ............ F02C 7/04; F02C 7/045; F02C 7/047; F02C 6/06; F02C 6/08; F01D 25/08; F01D 25/10; F01D 25/12; F01D 25/00
See application file for complete search history.

(56) References Cited

U.S. PATENT DOCUMENTS

| | | | | |
|---|---|---|---|---|
| 2,663,993 | A * | 12/1953 | Mosser | 60/223 |
| 3,572,960 | A * | 3/1971 | McBride | 415/115 |
| 5,974,802 | A | 11/1999 | Blake | |
| 6,004,095 | A * | 12/1999 | Waitz et al. | 415/119 |
| 6,027,304 | A | 2/2000 | Arar et al. | |
| 6,260,658 | B1 * | 7/2001 | Darrell et al. | 181/224 |

(Continued)

FOREIGN PATENT DOCUMENTS

| | | |
|---|---|---|
| CN | 201241751 Y | 5/2009 |
| EP | 1780381 A2 | 5/2007 |

(Continued)

OTHER PUBLICATIONS

U.S. Appl. No. 13/236,712, filed Sep. 20, 2011, Zhang, et al.

(Continued)

*Primary Examiner* — Phutthiwat Wongwian
*Assistant Examiner* — Rene Ford
(74) *Attorney, Agent, or Firm* — Sutherland Asbill & Brennan LLP

(57) ABSTRACT

The present application provides an inlet bleed heat system for supplying a flow of bleed air to a flow of incoming air into a compressor of a gas turbine engine. The inlet bleed heat system may include an air knife and a silencer panel. The air knife may include a compressor bleed air port in communication with the flow of bleed air and a discharge gap to discharge the flow of bleed air into the flow of incoming air. The air knife may and the silencer panel may form an integrated air knife/silencer panel.

19 Claims, 3 Drawing Sheets

(56) References Cited

U.S. PATENT DOCUMENTS

| | | | |
|---|---|---|---|
| 7,055,304 B2 * | 6/2006 | Courtot et al. | 60/39.093 |
| 7,913,936 B2 * | 3/2011 | Hoffmann | 239/553 |
| 8,001,789 B2 * | 8/2011 | Vega et al. | 60/785 |
| 8,613,186 B2 * | 12/2013 | Koganezawa et al. | 60/39.15 |
| 2010/0205967 A1 | 8/2010 | Gopalkrishna et al. | |
| 2010/0232945 A1 | 9/2010 | Zhang et al. | |
| 2010/0307165 A1 | 12/2010 | Wong et al. | |
| 2011/0042836 A1 | 2/2011 | Zhang et al. | |
| 2011/0058939 A1 | 3/2011 | Orosa et al. | |
| 2011/0162383 A1 * | 7/2011 | Zhang et al. | 60/782 |

FOREIGN PATENT DOCUMENTS

| | | |
|---|---|---|
| GB | 2451261 A | 1/2009 |
| KR | 20090042414 A | 4/2009 |

OTHER PUBLICATIONS

Nex Flow, Title: "Silent X-Stream, Air Blade, Air Knife," date: unknown, Nex Flow Air Products Corp., pp. B1-B26.

* cited by examiner

INLET BLEED HEAT SYSTEM WITH INTEGRATED AIR KNIFE/SILENCER PANELS

TECHNICAL FIELD

The present application and resultant patent relate generally to gas turbine engines and more particularly relate to an inlet bleed heat system for a gas turbine engine having integrated air knife/silencer panels for an improved air flow uniformity and pressure drop.

BACKGROUND OF THE INVENTION

Gas turbine engine compressors often include air inlet systems with heating devices for raising the temperature of the incoming air stream. Compressor IGV icing, surge/stall, combustion lean blowout, and the like may result due to cold ambient conditions and/or due to other types of operating parameters. As such, the compressor pressure ratio may be accommodated by bleeding an amount of compressor discharge air and recirculating the air back to the compressor inlet. Mixing the cooler ambient air with the bleed portion of the hot compressor discharge air reduces the air density and the mass flow to the gas turbine. Current inlet bleed heat systems may use impingement holes for air injection in a direction perpendicular to the main airflow direction. Other known inlet heat bleed systems may use acoustical nozzles in a filter house transition section for injection in the airflow direction. Many other types of inlet bleed heat control systems and methods of bleed injection also may be used.

Although these known inlet bled heat control systems may be adequate for heating the incoming airstream into the compressor, the nozzles and the piping usually involved in injecting the bleed air may disrupt the incoming airflow so as to result in an increase in the pressure drop thereacross. This interference may have an impact on overall gas turbine operation and efficiency when the inlet bled heat system is operational.

There is thus a desire for an improved inlet bleed heat system for a gas turbine engine. Preferably such an improved bleed heat system may adequately heat the incoming airflow with a reduced the pressure drop thereacross so as to provide temperature and flow uniformity while complying with relevant noise limitations and other operational parameters.

SUMMARY OF THE INVENTION

The present application and the resultant patent thus provide an inlet bleed heat system for supplying a flow of bleed air to a flow of incoming air into a compressor of a gas turbine engine. The inlet bleed heat system may include an air knife and a silencer panel. The air knife may include a compressor bleed air port in communication with the flow of bleed air and a discharge gap to discharge the flow of bleed air into the flow of incoming air. The air knife and the silencer panel may form an integrated air knife/silencer panel.

The present application and the resultant patent further may describe a method of providing inlet bleed heat control in a gas turbine engine. The method may include the steps of providing a flow of incoming air towards a compressor of the gas turbine engine, flowing the flow of incoming air through a number of integrated air knife/silencer panels, providing a flow of bleed air to the integrated air knife/silencer panels, forcing the flow of bleed air through a discharge gap in each of the integrated air knife/silencer panels, and entraining the flow of the incoming air with the flow of bleed air.

The present application and the resultant patent further provide a turbine inlet system for providing a flow of incoming air to a compressor of a gas turbine engine. The turbine inlet system may include an inlet duct leading to the compressor and an inlet bleed heat system positioned within the inlet duct. The inlet bleed heat system may be in communication with a flow of bleed air. The inlet bleed heat system may include a number of integrated air knife/silencer panels in communication with the flow of bleed air.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
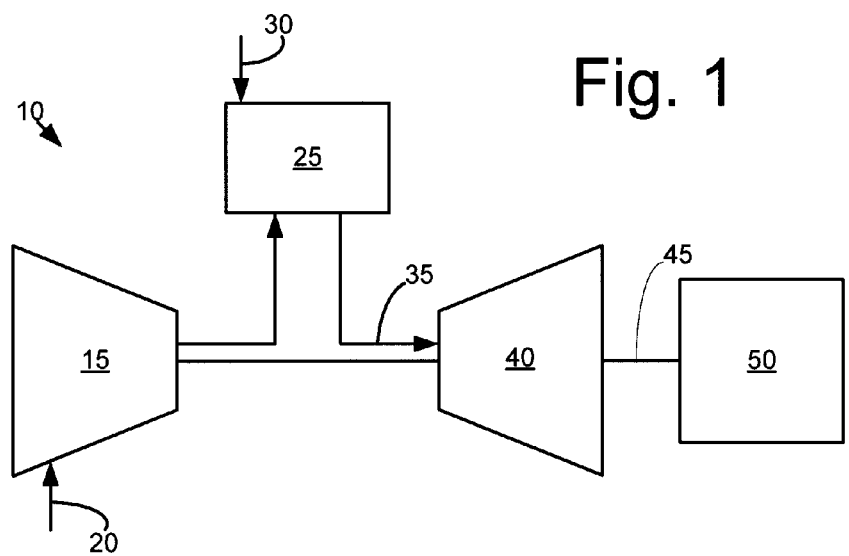
FIG. 1 is a schematic diagram of a gas turbine engine with a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, New York, including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
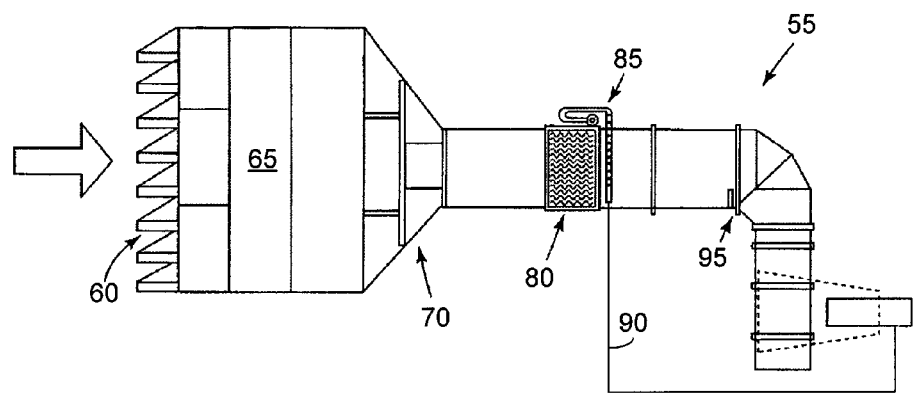
FIG. 2 is a schematic diagram of a turbine inlet system as may be used with the gas turbine engine of FIG. 1.

FIG. 2 is a schematic diagram of a turbine inlet system 55. The turbine inlet system 55 may be integrated with the compressor 15 of the gas turbine engine 10 described above and the like. The turbine inlet system 55 may include a weatherhood 60. The weatherhood 60 may prevent weather elements such as rain, snow, hail, and the like in the flow of air 20 from entering the compressor 15. The flow of air 20 then may flow through an inlet filter house 65. The inlet filter house 65 may remove foreign objects and debris from the flow of air 20. A transition piece 70 may extend downstream of the inlet filter house 65 and extend into an inlet duct 75. A silencer section 80 and an inlet bleed heat system 85 may be positioned within the inlet duct 75 or elsewhere in the turbine inlet system 55. The silencer section 80 may have any suitable size, shape, or configuration that effectively attenuates, damps, and/or reflects the acoustical energy from the compressor 15. The inlet bleed heat system 85 may heat the incoming flow of air 20 with a flow of compressor bleed air 90. As described above, the inlet bleed heat system 85 may use an impingement flow and the like. A trash screen 95 and the like may be located downstream of the inlet duct 75 so as to prevent debris from entering the compressor 15. The turbine inlet system 55 described herein is for the purposes of example only. Turbine inlet systems of many other configurations and with different components also may be known.

Figure 3:
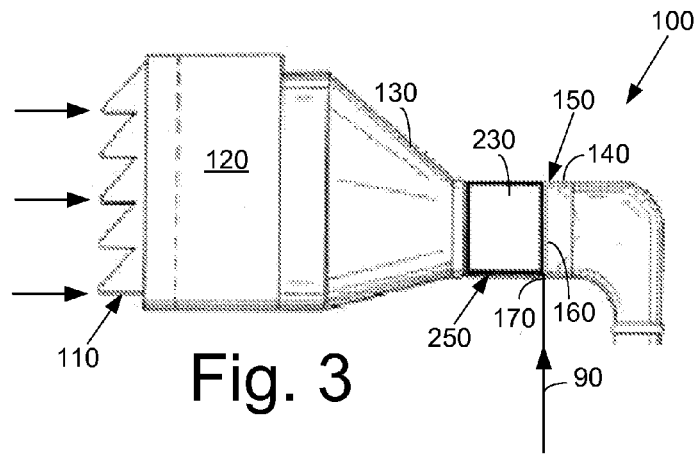
FIG. 3 is schematic diagram of a turbine inlet system with an inlet bleed heat system as may be described herein.

FIG. 3 shows a turbine inlet system 100 as may be described herewith. In a manner similar to that described above, the turbine inlet system 100 may include a weatherhood 110, an inlet filter house 120, a transition piece 130, and an inlet duct 140. The size, shape, and configuration of these components may vary. The turbine inlet system 100 may be used with the compressor 15 of the gas turbine engine 10 and the like. Other components and other configurations may be used herein.

The turbine inlet system 100 also may include an inlet bleed heat system 150. The inlet bleed heat system 150 may be positioned within the inlet duct 140 or elsewhere in the turbine inlet system 100. The inlet bleed heat system 150 may include a number of air knives 160. An "air knife" produces a largely laminar or diffused air flow along its length using a "Coanda" effect that entrains a large volume of air from surrounding areas by a smaller amount of compressed bleed air 90. Generally described, an air knife has no moving parts, is driven by air as opposed to electricity, and may be very quiet. Examples of air knives are sold by Nex Flow Air Products Corporation of Richmond Hill, Ontario, Canada under the designation "Silent X-Stream Air Blade Air Knife and the like. Other types of air injection devices may be used herein.

Figure 4:
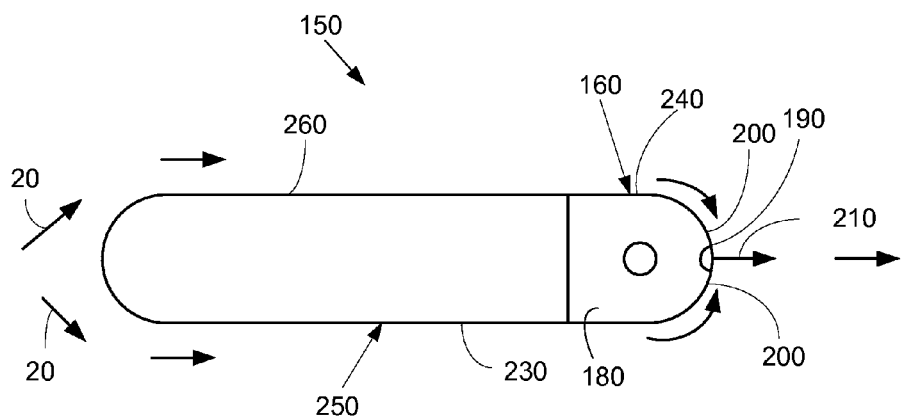
FIG. 4 is a top plan view of an integrated air knife/silencer panel of the inlet bleed heat system of FIG. 3.

As is shown in FIG. 4, the air knife 160 may include a compressor bleed port 170 in communication with the flow of compressor bleed air 90. The air knife 160 also may include an internal plenum 180 in communication with the compressor bleed port 170. The internal plenum 180 may lead to a discharge gap 190. The discharge gap 190 may run along the length of the air knife 160. The discharge gap 190 may be sized to accelerate the flow of compressor bleed air 90 therethrough. The size, shape, configuration, and angle of the discharge gap 190 may vary and may be optimized herein. The discharge gap 190 may be positioned about one or more inwardly curved ends 200. The shape and radius of the curved ends 200 may vary. The air knives 160 and the elements thereof may have any suitable size, shape, or configuration. Although a horizontal orientation is shown, a vertical orientation also may be used. Any number of the air knives 160 may be used herein. Air knives 160 of differing sizes and configuration also may be used herein together.

The compressor bleed air 90 thus enters the air knife 160 through the compressor bleed port 170 and exits through the discharge gap 190 about the inwardly curved ends 200. The incoming flow of air 20 thus may be entrained about the inwardly curved ends 200 of the air knife 160 by the compressor bleed air 90 exiting the discharge gap 190 under pressure into an entrained flow 210. The entrained flow 210 may have a higher velocity and pumping force in a well-defined main flow. The entrained flow 210 thus may reduce the pressure drop thereacross because the entrained flow 210 may act largely as an air pump for the incoming flow of air 20. Other components and other configurations may be used herein.

Figure 5:
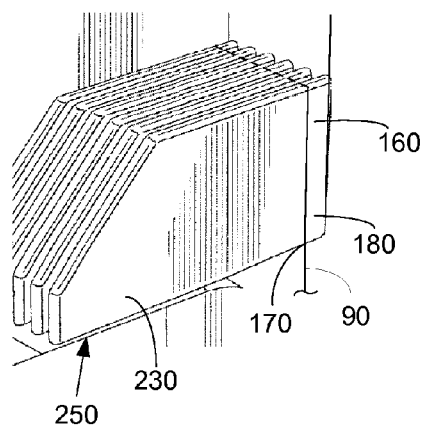
FIG. 5 is a perspective view of the integrated air knife/silencer panels of the inlet bleed heat system of FIG. 3.

As is shown in FIG. 4 and FIG. 5, the air nozzle 160 may be integrated within a silencer panel 230 at a downstream end 240 thereof as an integrated air knife/silencer panel 250. The silencer panel 230 may have any suitable size, shape, or configuration that effectively attenuates, damps, and/or reflects the acoustical energy from the compressor 15. The integrated air knife/silencer panels 250 may have a generally contoured shape 260 in any configuration. The inlet bleed heat system 150 may include any number of integrated air knife/silencer panels 250. Other components and other configurations may be used herein.

The air knives 160 may inject the compressor bleed air 90 into the main inlet airflow direction from about zero degrees (0°) to about ninety degrees (90°). Although the air knives 160 are shown in the horizontal section of the inlet duct 140, the vertical section or other locations in the turbine inlet system 100 also may be used. Given the position behind the silencer panels 230, the air knives 160 generally may have no adverse impact on the flow of air 20 when the inlet bleed heat system 150 is not operational.

Figure 6:
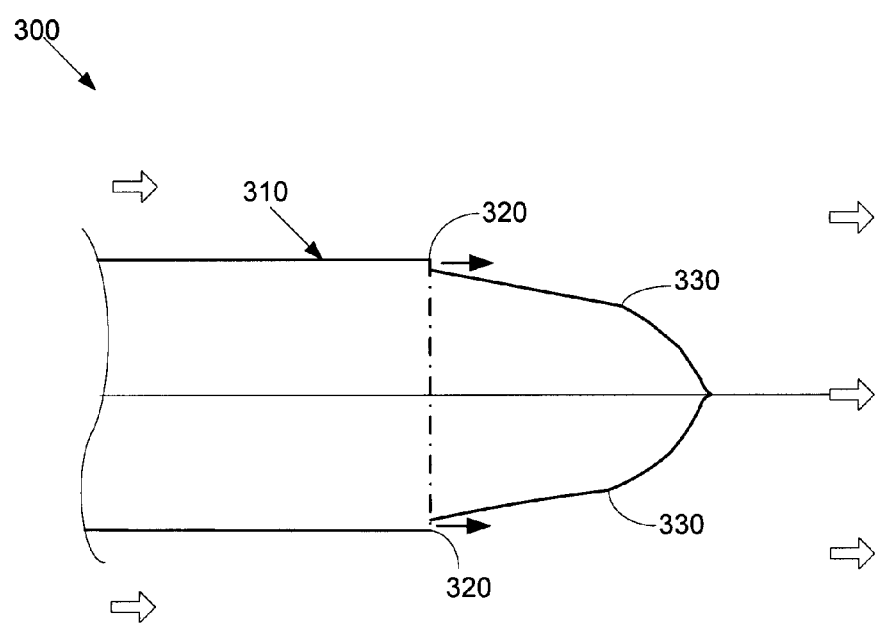
FIG. 6 is a top plan view of an alternative embodiment of an integrated air knife/silencer panel as may be described herein.

FIG. 6 shows an alternative embodiment of an integrated air knife/silencer panel 300 as may be described herein. In this example, an air knife 310 may have a pair of side discharge gaps 320. The side discharge gaps 320 may be positioned just upstream of a pair of inwardly curved ends 330. The side discharge gaps 320 may similarly entrain the incoming air flow 20 and the bleed heat flow 90 into the entrained flow 210. Other components and other configurations may be used herein.

Other variations may be used herein. For example, multiple discharge gaps may be positioned herein in stages. These discharge gaps may be controlled independently to maintain the maximum airflow velocity while the bleed heat flow 90 may vary. Moreover, the discharge gaps may be positioned elsewhere along the silencer panel 230.

The use of the air knives 160 of the integrated air knife/silencer panels 250 thus entrains a large amount of the incoming airflow 20 with the bleed air 90 as the entrained flow 210 so as to decrease the pressure drop thereacross. The use of the integrated air knife/silencer panels 250 with the contoured shape 260 also may aid in reducing the airflow pressure drop. Overall gas turbine efficiency and output therefore may be increased. The air knifes 160 also provide overall pressure and temperature uniformity. Moreover, the air knives 160 may generate less noise than known impingement or other types of bleed heat systems. The air knives 160 also should have a long component lifetime given the lack of moving parts therein. For syngas based turbines, the inlet airflow rate may be decreased due to the heating effect for increased efficiency given a decrease in the over bleed airflow.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An inlet bleed heat system for supplying a flow of bleed air to a flow of incoming air into a compressor of a gas turbine engine, comprising:

a bell mouth;

an air knife;

the air knife comprising a compressor bleed air port in communication with the flow of bleed air and a discharge gap to discharge the flow of bleed air into the flow of incoming air; and a silencer panel positioned downstream of the bell mouth, the silencer panel comprising a leading edge having a first height and a trailing edge having a second height that is greater than the first height, wherein the discharge gap is positioned at the trailing edge;

wherein the air knife and the silencer panel form an integrated air knife/silencer panel, such that the discharge gap of the air knife discharges the flow of bleed air downstream of the integrated air knife/silencer panel.

2. The inlet bleed heat system of claim 1, wherein the silencer panel further comprises a transitional portion in between the leading edge and the trailing edge having a third height that is greater than the first height and less than the second height.

3. The inlet bleed heat system of claim 1, wherein the air knife comprises an internal plenum extending from the bleed air port to the discharge gap.

4. The inlet bleed heat system of claim 1, wherein the air knife comprises one or more curved ends about the discharge gap.

5. The inlet bleed heat system of claim 1, wherein the air knife entrains the flow of incoming air and the flow of bleed air into an entrained flow.

6. The inlet bleed heat system of claim 1, further comprising a plurality of discharge gaps.

7. The inlet bleed heat system of claim 1, wherein the discharge gap accelerates the flow of bleed air.

8. The inlet bleed heat system of claim 1, wherein the discharge gap comprises a pair of side discharge gaps.

9. The inlet bleed heat system of claim 1, wherein the integrated air knife/silencer panel comprises a contoured shape.

10. The inlet bleed heat system of claim 1, further comprising a plurality of integrated air knife/silencer panels positioned adjacent to each other, such that the respective leading edges are positioned adjacent to each other and the respective trailing edges are positioned adjacent to each other.

11. The inlet bleed heat system of claim 1, wherein the inlet bleed heat system is positioned within an inlet duct of a turbine inlet system in communication with the compressor of the gas turbine engine.

12. A method of providing inlet bleed heat control in a gas turbine engine, comprising:

providing a flow of incoming air towards a compressor of the gas turbine engine;

flowing the flow of incoming air through a plurality of integrated air knife/silencer panels, wherein each silencer panel comprises a leading edge having a first height and a trailing edge having a second height that is greater than the first height;

providing a flow of bleed air to the plurality of integrated air knife/silencer panels;

forcing the flow of bleed air through a discharge gap of the plurality of integrated air knife/silencer panels, wherein the discharge gap is positioned at the respective trailing edges of the plurality of silencer panels; and entraining the flow of incoming air with the flow of bleed air by discharging bleed air via the discharge gap downstream of the integrated air knife/silencer panels.

13. The method of claim 12, wherein the step of forcing the flow of bleed air through the discharge gap comprises accelerating the flow of bleed air.

14. The method of claim 12, wherein the step of flowing the flow of incoming air through a plurality of integrated air knife/silencer panels comprises flowing the flow of incoming air along a contoured shape of the integrated air knife/silencer panels.

15. A turbine inlet system for providing a flow of incoming air to a compressor of a gas turbine engine, comprising:

a bell mouth;

an inlet duct leading to the compressor; and an inlet bleed heat system positioned within the inlet duct;

the inlet bleed heat system in communication with a flow of bleed air; and the inlet bleed heat system comprising a plurality of integrated air knife/silencer panels in communication with the flow of bleed air, wherein the integrated air knife/silencer panels each comprise a leading edge having a first height and a trailing edge having a second height that is greater than the first height, wherein a discharge gap is positioned at the trailing edge such that the flow of bleed air is discharged downstream of the integrated air knife/silencer panels.

16. The turbine inlet system of claim 15, wherein the plurality of integrated air knife/silencer panel comprises a compressor bleed air port in communication with the flow of bleed air.

17. The turbine inlet system of claim 16, wherein the plurality of integrated air knife/silencer panels comprises one or more curved ends about the discharge gap.

18. The turbine inlet system of claim 15, wherein the plurality of integrated air knife/silencer panels entrains the flow of incoming air and the flow of bleed air into an entrained flow.

19. The turbine inlet system of claim 15, wherein the plurality of integrated air knife/silencer panels comprises a contoured shape.

\* \* \* \* \*